(12) United States Patent
Hayase et al.

(10) Patent No.: US 7,498,103 B2
(45) Date of Patent: *Mar. 3, 2009

(54) HOLOGRAPHIC RECORDING MEDIUM AND METHOD OF MANUFACTURING THE SAME

(75) Inventors: Rumiko Hayase, Yokohama (JP); Akiko Hirao, Chiba (JP); Kazuki Matsumoto, Kawasaki (JP); Takayuki Tsukamoto, Kawasaki (JP); Katsutaro Ichihara, Yokohama (JP); Urara Ichihara, legal representative, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 563 days.

This patent is subject to a terminal disclaimer.

(21) Appl. No.: 11/129,403

(22) Filed: May 16, 2005

(65) Prior Publication Data

US 2006/0014081 A1    Jan. 19, 2006

(30) Foreign Application Priority Data

Jul. 16, 2004    (JP)    ............................. 2004-210197

(51) Int. Cl.
*G03H 1/02*    (2006.01)
(52) U.S. Cl. .................................. 430/1; 430/2; 359/3
(58) Field of Classification Search .................. None
See application file for complete search history.

(56) References Cited

U.S. PATENT DOCUMENTS

| | | | | | |
|---|---|---|---|---|---|
| 4,859,788 | A | * | 8/1989 | Brindopke et al. | 558/398 |
| 5,581,646 | A | * | 12/1996 | Tsukamoto et al. | 385/96 |
| 6,081,632 | A | * | 6/2000 | Yoshimura et al. | 385/5 |
| 6,103,454 | A | | 8/2000 | Dhar et al. | |
| 2003/0139486 | A1 | * | 7/2003 | Yamada et al. | 522/71 |
| 2005/0068593 | A1 | * | 3/2005 | Hayase et al. | 359/1 |
| 2005/0174917 | A1 | * | 8/2005 | Matsumoto et al. | 359/103 |
| 2005/0196679 | A1 | * | 9/2005 | Hayase et al. | 430/1 |
| 2006/0077857 | A1 | * | 4/2006 | Hirao et al. | 369/112.01 |
| 2006/0115740 | A1 | * | 6/2006 | Hayase et al. | 430/1 |

(Continued)

FOREIGN PATENT DOCUMENTS

JP    7-261643    10/1995

(Continued)

OTHER PUBLICATIONS

Trentler et al. "Epoxy resin photopolymer composites for volume holography", Chem. Mater. vol. 12 pp. 1431-1438 (2000).*

(Continued)

*Primary Examiner*—Martin J Angebranndt
(74) *Attorney, Agent, or Firm*—Finnegan, Henderson, Farabow, Garrett & Dunner, L.L.P.

(57) ABSTRACT

Disclosed is a holographic recording medium and methods of manufacturing the holographic recording medium. The example of the medium has a recording layer containing a three dimensionally cross-linked polymer matrix including an epoxy resin, a radically polymerizable monomer, and a photo radical polymerization initiator. The radically polymerizable monomer comprises both N-vinylcarbazole (VC) and N-vinylpyrrolidone (VP) or N-vinylcarbazole alone. The weight ratio of N-vinylcarbazole (VC) to the sum of N-vinylcarbazole (VC) and N-vinylpyrrolidone (VP), i.e., (VC/(VC+VP)), is not smaller than 0.75 and not larger than 1.0.

11 Claims, 3 Drawing Sheets

U.S. PATENT DOCUMENTS

| | | | |
|---|---|---|---|
| 2007/0030541 A1* | 2/2007 | Hayase et al. ................ | 359/3 |
| 2007/0072089 A1* | 3/2007 | Sasao et al. ................... | 430/1 |
| 2007/0224541 A1* | 9/2007 | Hayase et al. ............ | 430/280.1 |
| 2007/0231744 A1* | 10/2007 | Sasao et al. .............. | 430/281.1 |
| 2007/0292803 A1* | 12/2007 | Matsumoto et al. ...... | 430/270.1 |
| 2008/0080335 A1* | 4/2008 | Matsumoto et al. ...... | 369/44.23 |

FOREIGN PATENT DOCUMENTS

| | | |
|---|---|---|
| JP | 2001-282082 | 10/2001 |
| JP | 2002-244535 | 8/2002 |
| JP | 2004-59608 | 2/2004 |

OTHER PUBLICATIONS

Trentler et al., "Homolographic data storage materials formed by photopolymerization in epoxy matrices", Polym. Prepr., vol. 40, pp. 687-688 (1999).*

Trentler, et al., "Epoxy-Photopolymer composites: Thick Recording Media for Holographic Data Storage", Proceedings of SPIE, vol. 4296, pp. 259-266, (2001).

Hayase, et al., "Holographic Recording Medium", U.S. Appl. No. 10/986,059, filed Nov. 12, 2004.

Notification of Reasons for Rejection from the Japanese Patent Office, mailed Jun. 10, 2008, in Japanese Patent Application No. 2004-210197, and English translation thereof.

* cited by examiner

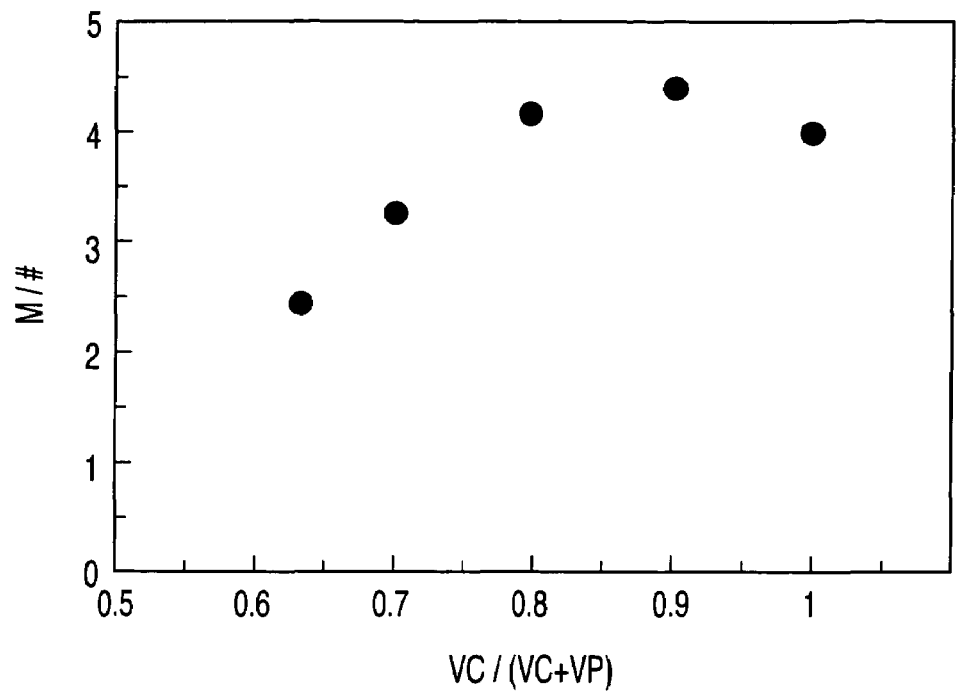
F I G. 6
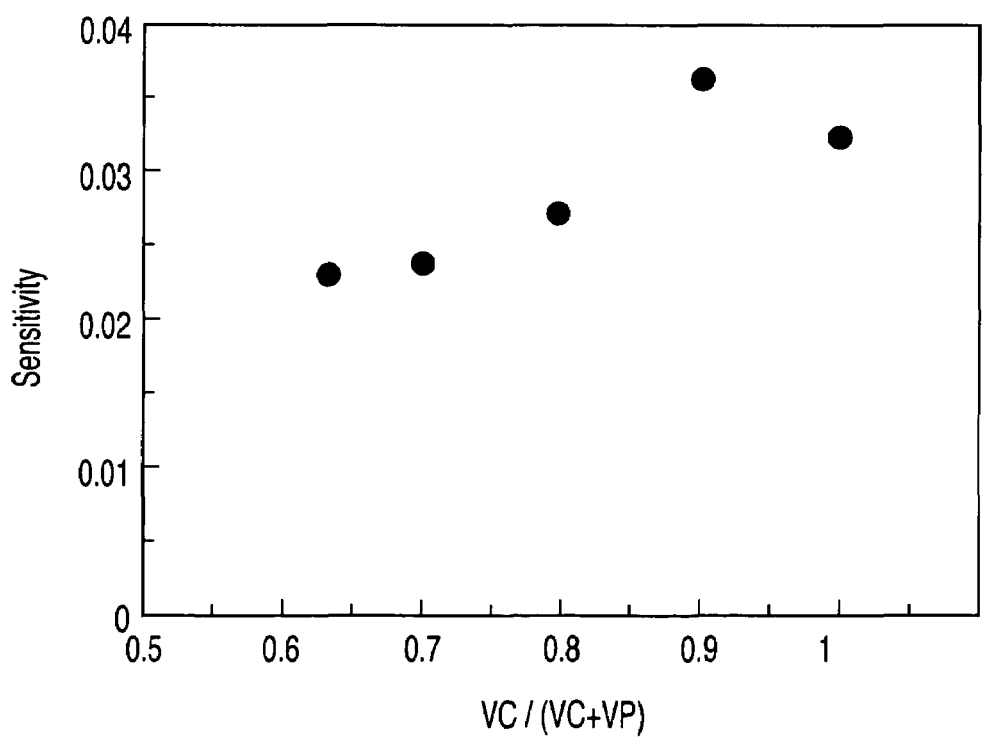
F I G. 7

HOLOGRAPHIC RECORDING MEDIUM AND METHOD OF MANUFACTURING THE SAME

CROSS-REFERENCE TO RELATED APPLICATIONS

This application is based upon and claims the benefit of priority from prior Japanese Patent Application No. 2004-210197, filed Jul. 16, 2004, the entire contents of which are incorporated herein by reference.

BACKGROUND OF THE INVENTION

1. Field of the Invention

The present invention relates to an optical recording medium, particularly, to a holographic recording medium, and a method of manufacturing the same.

2. Description of the Related Art

A holographic memory that permits recording information in the form of a hologram is capable of a large capacity recording and, thus, attracts attention as a recording medium of the next generation. As the photosensitive composition for recording the hologram, known is a composition which contains, for example, a radically polymerizable monomer, a thermoplastic binder resin, a photo radical polymerization initiator, and a sensitizing pigment as the main components. The photosensitive composition for recording the hologram is formed into a film and, then, an interference light exposure is performed, thereby recording the information.

In the portion irradiated with light of a high intensity, the polymerization reaction of the radically polymerizable monomer proceeds, and the radically polymerizable monomer is diffused from the portion irradiated with light of a low intensity toward the portion irradiated with light of a high intensity so as to bring about the concentration gradient. In other words, a difference in density is generated in the radically polymerizable monomer in accordance with the intensity of the interference light so as to bring about a difference in the refractive index.

Proposed in recent years are a recording medium prepared by dispersing radically polymerizable monomers in an epoxy matrix. The recording medium is disclosed in "Epoxy-Photopolymer Composites: Thick Recording Media for Holographic Data storage (T. J. Trentler, J. E Boid and V. L. Colvin)"; Proceedings of SPIE, 2001, Vol. 4296, pp259-266, for example. In preparing the recording medium, N-vinylcarbazole and N-vinylpyrrolidone are used as the radically polymerizable monomers. Specifically, N-vinylcarbazole, which is in the form of a solid, is dissolved in N-vinylpyrrolidone, which is in the form of a liquid under room temperature, and the resultant solution is mixed with an epoxy compound. It is said that the equimolar amount is the upper limit of N-vinylcarbazole that can be dissolved in N-vinylpyrrolidone, i.e., N-vinylcarbazole cannot be dissolved in N-vinylpyrrolidone in a molar amount larger than the molar amount of N-vinylpyrrolidone. In terms of the weight of N-vinylcarbazole that can be dissolved in N-vinylpyrrolidone, the upper limit of the weight ratio of N-vinylcarbazole (VC) to the sum of N-vinylcarbazole (VC) and N-vinylpyrrolidone (VP), i.e., VC/(VC+VP), is 0.634.

BRIEF SUMMARY OF THE INVENTION

In order to increase the change in refractive index, it is effective to add a polymerizable monomer having a high refractive index. However, since the polymerizable monomers having a high refractive index are in the form of a solid in almost all the cases, the monomers having a high refractive index are dissolved in many cases in a polymerizable monomer that is in a liquid form under room temperature. Since the polymerizable monomer that is in the form of a liquid under room temperature has a low refractive index, it is difficult to obtain a sufficient large change in refractive index. It may be certainly possible to increase the change in refractive index if the amount of the polymerizable monomer contained in the recording medium is increased. In this case, however, the polymerization causes the shrinkage of the recording layer to be locally increased, thereby making it difficult to readout the recorded data accurately.

A holographic recording medium according to one aspect of the present invention comprises a holographic recording medium, comprising a recording layer containing a three dimensionally cross-linked polymer matrix including an epoxy compound, a radically polymerizable monomer, and a photo radical polymerization initiator, the radically polymerizable monomer comprising both N-vinylcarbazole and N-vinylpyrrolidone or N-vinylcarbazole alone, and the weight ratio represented by following relationship being satisfied.

$$0.75 \leq VC/(VC+VP) \leq 1.0$$

wherein VC is weight of N-vinylcarbazole and VP is weight of N-vinylpyrrolidone.

A method of manufacturing a holographic recording medium according to one aspect of the present invention comprises preparing a solution of a recording layer material by adding to an epoxy compound of a liquid form N-vinylcarbazole, a photo radical polymerization initiator, and a curing agent for the epoxy compound, the N-vinylcarbazole being added in an amount not smaller than 2% by weight of the epoxy compound; coating a substrate with the solution of the recording layer material, and curing the solution.

A method of manufacturing a holographic recording medium according to another aspect of the present invention comprises preparing a solution of a recording layer material by adding to an epoxy compound of liquid form both N-vinylcarbazole and N-vinylpyrrolidone or N-vinylcarbazole, a photo radical polymerization initiator, and a curing agent for the epoxy compound; coating a substrate with the solution of the recording layer material; and curing the solution.

BRIEF DESCRIPTION OF THE SEVERAL VIEWS OF THE DRAWING

FIG. 6 is a graph showing the relationship between the weight ratio of monomers and the value of M/#; and FIG. 7 is a graph showing the relationship between the weight ratio of monomers and the sensitivity (inclination of the internal diffraction efficiency to the power of ½ relative to the exposure dosage).

DETAILED DESCRIPTION OF THE INVENTION

Figure 1:
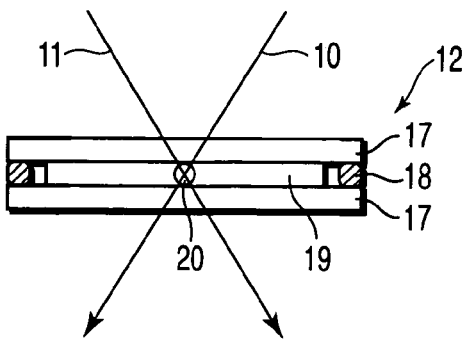
FIG. 1 is a cross sectional view schematically showing the construction of a transmission type holographic recording medium according to one embodiment of the present invention.

An embodiment of the present invention will now be described.

The recording layer included in a holographic recording medium according to one embodiment of the present invention contains a three dimensionally cross-linked polymer matrix including an epoxy resin, a radically polymerizable monomer, and a photo radical polymerization initiator. The radically polymerizable monomers are constituted by a combination of N-vinylcarbazole (VC) and N-vinylpyrrolidone (VP) or N-vinylcarbazole alone. When the combination is used, the weight ratio of N-vinylcarbazole (VC) to the sum of N-vinylcarbazole (VC) and N-vinylpyrrolidone (VP), i.e., (VC/(VC+VP)), is not smaller than 0.75 and not larger than 1.0.

N-vinylcarbazole has a high refractive index and, thus, is large in the change of refractive index caused by light irradiation, thereby making it possible to obtain a recording layer having a high diffraction efficiency. Also, the sensitivity can be increased by adding a small amount of N-vinylpyrrolidone. Incidentally, since the three dimensionally cross-linked polymer matrix is formed of an epoxy resin, shrinkage of the recording layer can be suppressed. It follows that it is possible to obtain a holographic recording medium having a high sensitivity and a high diffraction efficiency and excellent in the effect of suppressing the volume shrinkage of the recording layer.

It is desirable to use an epoxy compound of a liquid form at 20° C. or less and which is capable of dissolving N-vinylcarbazole in an amount of at least 2% by weight, more desirably at least 5% by weight, and furthermore desirably at least 10% by weight. To be more specific, the epoxy compound includes, for example, 1,4-butanediol diglycidyl ether, 1,6-hexanediol diglycidyl ether, diethylene glycol diglycidyl ether, polyethylene glycol diglycidyl ether, polypropylene glycol diglycidyl ether, neopentyl glycol diglycidyl ether, diepoxy octane, resorcinol diglycidyl ether, diglycidyl ether of bisphenol A, diglycidyl ether of bisphenol F, 3,4-epoxy cyclohexenyl methyl-3',4'-epoxy cyclohexene carboxylate and polydimethyl siloxane of epoxy propoxypropyl terminal.

It is possible to use amines, phenols, organic acid anhydrides and amides as the curing agent for curing the epoxy compound. To be more specific, the compounds that can be used as the curing agent include, for example, ethylenediamine, diethylenetriamine, triethylenetetraamine, tetraethylenepentaamine, pentaethylenehexaamine, hexamethylenediamine, menthenediamine, isophoronediamine, bis(4-amino-3-methyldicyclohexyl)methane, bis(aminomethyl) cyclohexane, N-aminoethylpiperazine, m-xylylenediamine, 1,3-diaminopropane, 1,4-diaminobutane, trimethylhexamethylenediamine, iminobispropylamine, bis(hexamethylene) triamine, 1,3,6-trisaminomethylhexane, dimethylaminopropylamine, aminoethylethanolamine, tri(methylamino) hexane, m-phenylenediamine, p-phenylenediamine, diaminodiphenylmethane, diaminodiphenylsulfone, 3,3'-diethyl-4,4'-diaminodiphenylmethane, maleic anhydride, succinic anhydride, tetrahydrophthalic anhydride, methyltetrahydrophthalic anhydride, methyl nadic anhydride, hexahydrophthalic anhydride, methylhexahydrophthalic anhydride, methylcyclohexenetetracarboxylic anhydride, phthalic anhydride, trimellitic anhydride, benzophenonetetracarboxylic anhydride, dodecenylsuccinic anhydride, ethyleneglycol bis(anhydroustrimellitate), phenolnovolak resin, cresol novolak resin, polyvinylphenol resin, terpenephenol resin, and polyamide resin.

Aliphatic primary amines exhibit a high curing rate and are capable of being cured at room temperature. Therefore, the aliphatic primary amine compounds are suitably used. Among the aliphatic amine compounds noted above, it is particularly desirable to use diethylenetriamine, triethylenetetraamine, tetraethylenepentaamine, pentaethylenehexaamine, and iminobispropylamine. It is desirable to use any of these amine compounds in a mixing amount that the amount of NH— of the amine compound is 0.6 to 2 times as much as the equivalent of oxirane of the epoxy compound. Where the amine compound is mixed in an amount smaller than 0.6 times or larger than 2 times as large as the equivalent, the sensitivity and/or the diffraction efficiency would be lowered.

Further, it is possible to add a curing catalyst, as desired. A basic catalyst that is known as a curing catalyst of the epoxy compound can be used as the curing catalyst. For example, it is possible to use tertiary amines, organic phosphine compounds, imidazole compounds, and derivatives thereof as the curing catalyst. To be more specific, the compounds used as the curing catalyst include, for example, triethanolamine, piperidine, N,N'-dimethylpiperadine, 1,4-diazadicyclo(2,2,2)octane(triethyleneamine), pyridine, picoline, dimethylcyclohexylamine, dimethylhexylamine, benzyldimethylamine, 2-(dimethylamino methyl)phenol, 2,4,6-tris(dimethylamino methyl)phenol, DBU (1,8-diazabicyclo[5,4,0]-undeca-7-ene), salicylic acid or phenol salts thereof, trimethylphosphine, triethylphosphine, tributylphosphine, triphenylphosphine, tri(p-methylphenyl)phosphine, 2-methylimidazole, 2,4-dimethylimidazole, 2-ethyl-4-methylimidazole, 2-phenylimidazole, 2-phenyl-4-methylimidazole, and 2-heptaimidazole. It is also possible to use latent catalysts such as boron trifluoride amine complex, dicyandiamide, an organic acid hydrazide, diamino maleonitrile and derivatives thereof, melamine and derivatives thereof, and amine imide.

The radically polymerizable monomer (radically polymerizable compound) includes a combination of N-vinylcarbazole (VC) and N-vinylpyrrolidone (VP). In this case, the weight ratio of N-vinylcarbazole (VC) to the sum of N-vinylcarbazole (VC) and N-vinylpyrrolidone (VP), i.e., (VC/(VC+VP)), is not smaller than 0.75, desirably not smaller than 0.8, and more desirably not smaller than 0.85 for further improving the sensitivity. Alternatively, it is also possible to use N-vinylcarbazole (VC) alone as the radically polymerizable monomer. N-vinylcarbazole has a high refractive index and, thus, the change in refractive index caused by the light irradiation is large, thereby making it possible to obtain a recording medium having a high diffraction efficiency. On the other hand, N-vinylpyrrolidone exhibits a reactivity higher than that of N-vinylcarbazole and has a small molar volume. Thus, N-vinylpyrrolidone diffuses easily. It follows that the sensitivity can be further improved by adding a small amount of N-vinylpyrrolidone to N-vinylcarbazole. However, if the weight ratio VC/(VC+VP) noted above is smaller than 0.75, the sensitivity and/or the diffraction efficiency of the recording medium are lowered.

The recording performance of a hologram can be evaluated by M/# (M number) representing the recording dynamic range. The M number (M/#) is defined by the formula given below by using $\eta_i$, wherein $\eta_i$ represents the diffraction efficiency from the i-th hologram in the case where the hologram of n-pages is subjected to an angular multiplexing recording and readout until the recording in the same region within the recording layer of the holographic recording medium is rendered impossible:

$$M/\# = \sum_{i=1}^{n} \sqrt{\eta}\, i$$

It is desirable for the sum of N-vinylpyrrolidone and N-vinylcarbazole to not smaller than 2% by weight and not larger than 50% by weight based on the entire recording layer including the epoxy resin, the curing agent of the epoxy resin, the photo radical polymerization initiator, N-vinylpyrrolidone, N-vinylcarbazole, etc. If the sum noted above is smaller than 2% by weight, it is impossible to increase sufficiently the refractive index of the recording layer. On the other hand, if the sum noted above exceeds 50% by weight, the volume shrinkage of the recording layer is increased, thereby making impossible to record and readout the information accurately. It is more desirable for sum of N-vinylpyrrolidone and N-vinylcarbazole to not smaller than 5% by weight and not larger than 40% by weight, furthermore desirably not smaller than 10% by weight and not larger than 30% by weight, based on the entire recording layer.

It is possible to add as desired radically polymerizable compounds other than N-vinylcarbazole and N-vinylpyrrolidone. For example, it is possible to add a compound having an ethylenically unsaturated double bond including, for example, an unsaturated carboxylic acid, an unsaturated carboxylic acid ester, an unsaturated carboxylic acid amide, and a vinyl compound. To be more specific, the radically polymerizable compound includes, for example, acrylic acid, methylacrylate, ethylacrylate, propylacrylate, butylacrylate, isobutyacrylate, 2-ethylehexylacrylate, octylacrylate, laurylacrylate, stearylacrylate, cyclohexylacrylate, bicyclopentenylacrylate, phenylacrylate, isobornylacrylate, adamantylacrylate, methacrylic acid, methylmethacrylate, propylmethacrylate, butylmethacrylate, phenymethacrylate, phenoxyethylacrylate, chlorophenylacrylate, adamantylmethacrylate, isobornylmethacrylate, N-methylacrylamide, N, N-dimethylacrylamide, N, N-methylenebis-acrylamide, acryloylmorpholine, vinylpyridine, styrene, bromostyrene, chlorostyrene, tribromophenylacrylate, trichlorophenylacrylate, tribromophenylmethacrylate, trichlorophenylmethacrylate, vinylbenzoate, 3,5-dichlorovinylbenzoate, vinylnaphthalene, vinylnaphthoate, naphtylmethacrylate, naphthylacrylate, N-phenylmethacrylamide, N-phenylacrylamide, N-vinylpyrrolidinone, 1-vinylimidazole, bicyclopentenylacrylate, 1,6-hexanediolacrylate, pentaerythritoltriacrylate, pentaerythritoltetraacrylate, dipentaerythritolhexaacrylate, diethyleneglycoldiacrylate, polyethyleneglycoldiacrylate, polyethyleneglycoldimethacrylate, tripropyleneglycoldiacrylate, propyleneglycoltrimethacrylate, diallylphthalate, and triallyltrimellitate.

The photo radical polymerization initiator includes, for example, benzoin ether, benzyl ketal, acetophenone derivatives, α-aminoacetophenons, benzophenone derivatives, acylphosphine oxides, triazines, titanocenes, organic peroxide, and thioxanthone derivatives. To be more specific, the photo radical polymerization initiator includes, for example, benzyl, benzoin, benzoin ethyl ether, benzoin isopropyl ether, benzoin isobutyl ether, 1-hydroxycyclohexyl phenyl ketone, benzyl methyl ketal, benzyl ethyl ketal, benzyl methoxy ethyl ether, 2,2'-diethyl acetophenone, 2,2'-dipropyl acetophenone, 2-hydroxy-2-methyl propiophenone, p-tert-butyl trichloro acetophenone, thioxanthone, 2-chloro thioxanthone, 3,3',4,4'-tetra(t-butyl peroxycarbonyl)benzophenone, 2,4,6-tris(trichloromethyl)1,3,5-triazine, 2-(p-methoxyphenyl)-4,6-bis(trichloromethyl)1,3,5-triazine, 2-[(p-methoxy phenyl) ethylene]-4,6-bis(trichloromethyl)1,3,5-triazine, diphenyl-(2,4,6-trimethyl benzoyl)phosphine oxide, Irgacure 149, 184, 369, 651, 784, 819, 907, 1700, 1800, and 1850 manufactured by Ciba Specialty Chemicals Inc., di-t-butyl peroxide, dicumyl peroxide, t-butyl cumyl peroxide, t-butyl peroxy acetate, t-butyl peroxy phthalate, t-butyl peroxy benzoate, acetyl peroxide, isobutylyl peroxide, decanoyl peroxide, lauroyl peroxide, benzoyl peroxide, t-butyl hydroperoxide, cumene hydroperoxide, methylethyl ketone peroxide, and cyclohexanone peroxide.

It is desirable for the photo radical polymerization initiator exemplified above to be mixed in an amount of not smaller than 0.1% by weight and not larger than 10% by weight based on the amount of the radically polymerizable compound pointed out previously. Where the mixing amount of the photo radical polymerization initiator is smaller than 0.1% by weight, it is difficult to obtain a sufficiently large change in the refractive index. On the other hand, if the mixing amount noted above exceeds 10% by weight, the light absorption tends to be rendered excessively high, with the result that the sensitivity and/or the diffraction efficiency of the recording medium tend to be lowered. It is more desirable for the mixing amount of the photo radical polymerization initiator to not smaller than 0.5% by weight and not larger than 6% by weight based on the amount of the radically polymerizable compound.

It is possible to add as required a sensitizing pigment such as cyanine, merocyanine, xanthene, coumarin, or eosine as well as a silane coupling agent and a plasticizer to the composition forming the holographic recording medium.

The holographic recording medium according to the embodiment of the present invention can be obtained by coating a substrate with a solution of the recording layer material containing the prescribed components described above, followed by achieving a three dimensional cross-linkage of the matrix polymer, thereby forming the recording layer. In preparing the solution of the recording layer material, a monomer solution is prepared first by dissolving both N-vinylcarbazole and N-vinylpyrrolidone used as radically polymerizable monomers or by dissolving N-vinylcarbazole alone, in the epoxy compound. Further, the solution of the recording layer material is obtained by adding a photo radical polymerization initiator and a curing agent to the monomer solution noted above.

A glass substrate or a plastic substrate can be used as the substrate. Also, a casting method or a spin coating method can be employed for coating the substrate with the solution of the recording layer material. It is also possible to dispose two glass substrates or two plastic substrates in a manner to face each other with a spacer made of resin interposed therebetween in the peripheral regions of the two substrates and to pour the solution of the recording layer material into the clearance between the two substrates. In the cross-linking reaction stage, it is possible to heat the reaction system from about 30° C. to about 150° C. in view of the reactivity of the curing agent added to the reaction system, though the three dimensional cross-linking reaction proceeds even under room temperature in the case where an aliphatic primary amine is used as the curing agent. It is desirable for the thickness of the recording layer to not smaller than 20 µm and not larger than 2 mm. Where the thickness of the recording layer is smaller than 20 µm, it is difficult to obtain a sufficient large recording capacity. On the other hand, if the thickness of the recording layer exceeds 2 mm, the sensitivity and/or the diffraction efficiency of the recording layer tend to be lowered. It is more desirable for the thickness of the recording layer to not smaller than 50 µm and not larger than 1 mm.

In the holographic recording medium according to the embodiment of the present invention, the holographic recording-readout can be performed by allowing an information light and a reference light to interfere with each other inside the recording layer. It is possible for the recorded hologram (holography) to be either a transmission type hologram (transmission type holography) or a reflection type hologram (reflection type holography). The interference between the information light and the reference light can be performed by an interference method in which the interference is performed between two light fluxes or by a coaxial interference method.

In the transmission type holographic recording medium according to the embodiment of the present invention, the recording is performed as shown in, for example, FIG. 1. To be more specific, FIG. 1 schematically shows a transmission type holographic recording medium 12 used in the two light flux interference holography and also shows the information light and the reference light in the vicinity of the transmission type holographic recording medium 12. The holographic recording medium 12 shown in FIG. 1 comprises a pair of transparent substrates 17 each made of glass or a plastic material such as polycarbonate. As shown in the drawing, a spacer 18 and a recording layer 19 are held between the two transparent substrates 17. The recording layer 19 contains a specified polymer matrix three dimensionally cross-linked, a radically polymerizable compound, and a photo radical polymerization initiator.

The transmission type holographic recording medium 12 of the construction shown in FIG. 1 is irradiated with an information light 10 and a reference light 11. These light beams 10 and 11 are made to cross each other in the recording layer 19 as shown in the drawing, with the result that a transmission type hologram is formed by the interference in a modulating region 20.

Figure 2:
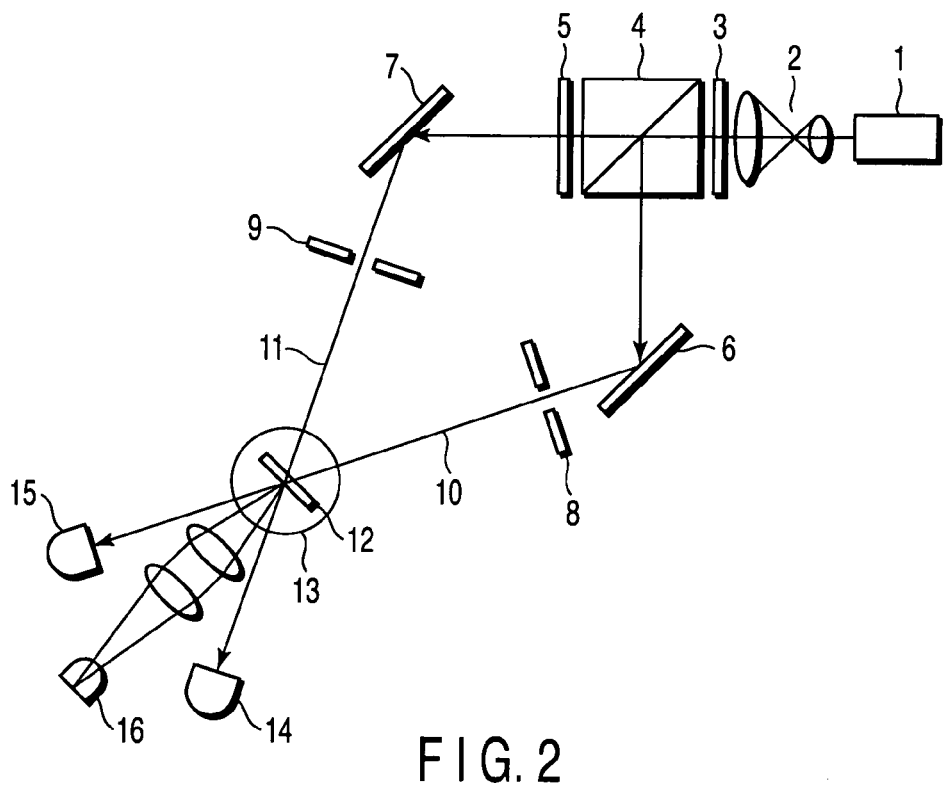
FIG. 2 schematically shows the construction of a transmission type holographic information recording-readout apparatus.

FIG. 2 schematically exemplifies the construction of a transmission type holographic recording-readout apparatus. The recording-readout apparatus shown in the drawing is a transmission type holographic optical information recording-readout apparatus utilizing the transmission type two light flux interference method.

The light beam emitted from a light source device 1 is introduced into a polarizing beam splitter 4 through a beam expander 2 and a wave plate 3. A light source that emits a light capable of interference in the recording layer 19 of the holographic recording medium 12 can be used as the light source device 1. However, it is desirable to use as the light source device 1 a linearly polarized laser in view of its capability of interference. The laser noted above includes, for example, a semiconductor laser, an He—Ne laser, an argon laser and a YAG laser.

The beam expander 2 serves to expand the light beam emitted from the light source device 1 so as to permit the expanded light beam to have a diameter adapted for the holographic recording. The light beam expanded by the beam expander 2 is subjected to a rotary polarization in the wave plate 3 so as to generate a light beam having an S-polarized light component and a P-polarized light component. It is possible for the wave plate 3 to be formed of, for example, a ½ wavelength plate or a ¼ wavelength plate.

The S-polarized light component of the light beam transmitted through the wave plate 3 is reflected by the polarizing beam splitter 4 so as to form the information light 10. On the other hand, the P-polarized light component of the light beam transmitted through the wave plate 3 is transmitted through the polarizing beam splitter 4 so as to form the reference light 11. Incidentally, the direction of the rotary polarization of the light incident at the polarizing beam splitter 4 is controlled by using the wave plate 3 so as to make the information light 10 and the reference light 11 equal to each other in the intensity at the position of the recording layer 19 of the holographic recording medium 12.

The information light 10 reflected by the polarizing beam splitter 4 is reflected by a mirror 6 so as to permit the information light 10 to pass through an electromagnetic shutter 8 and, then, the recording layer 19 of the holographic recording medium 12 held on a rotary stage 13 is irradiated with the reflected information light 10.

On the other hand, the polarizing direction of the reference light 11 passing through the polarizing beam splitter 4 is rotated by 90° by a wave plate 5 so as to form an S-polarized light. The S-polarized light thus formed is reflected by a mirror 7 and, then, passes through an electromagnetic shutter 9 as the reference light 11. Further, the holographic recording medium 12 is irradiated with the S-polarized light (reference light 11) such that the S-polarized light crosses the information light 10 within the recording layer 19 of the holographic recording medium 12 held on the rotary stage 13 so as to form a transmission type hologram as a refractive index modulating region 20.

For readout the information thus recorded, the information light 10 is intercepted by closing the electromagnetic shutter 8 so as to allow the transmission type hologram (refractive index modulating layer 20) formed inside the recording layer 19 of the holographic recording medium 12 to be irradiated with the reference light 11 alone. When passing through the holographic recording medium 12, the reference light 11 is diffracted by the transmission type hologram and the diffracted light is detected by a photo detector 15. Incidentally, a reference numeral 14 denotes a photo detector for monitoring the light beam passing through the recording medium.

In order to polymerize the unreacted radically polymerizable compound after completion of the holographic recording for stabilizing the recorded hologram, it is possible to arrange an ultraviolet light source device 16 and an optical system for irradiation of the ultraviolet light as shown in the drawing. It is possible to use an optional light source that emits light capable of polymerizing the unreacted radically polymerizable compound as the ultraviolet light source device 16. It is possible for the ultraviolet light source device 16 to be formed of, for example, a xenon lamp, a mercury lamp, a high pressure mercury lamp, a mercury xenon lamp, a gallium nitride series light emitting diode, a gallium nitride series semiconductor laser, an excimer laser, a tertiary higher harmonic wave component (355 nm) of a Nd:YAG laser, or a quaternary higher harmonic wave component (266 nm) of an Nd:YAG laser in view of the high emission efficiency of the ultraviolet light.

Next, the reflection type holographic recording medium will be described.

Figure 3:
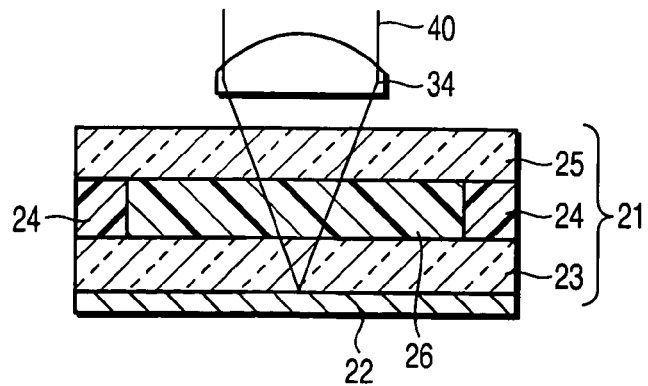
FIG. 3 is a cross sectional view schematically showing the construction of a reflection type holographic recording medium according to another embodiment of the present invention.

FIG. 3 shows a reflection type holographic recording medium according to another embodiment of the present invention. In the reflection type holographic recording medium, the information is recorded as shown in FIG. 3. FIG. 3 schematically shows a reflection type holographic recording medium 21 and also shows the information light and the reference light in the vicinity of the reflection type holographic recording medium. The holographic recording medium 21 shown in FIG. 3 comprises a pair of transparent substrates 23 and 25 each made of glass or a plastic material such as polycarbonate, a spacer 24 and a recording layer 26, which are held between the substrates 23 and 25, and a reflective layer 22 formed on the substrate 22. The recording layer 26 contains a specified polymer matrix that is three dimensionally cross-linked, a radically polymerizable compound, and a photo radical polymerization initiator.

The reflection type holographic recording medium 21 is also irradiated with an information light and a reference light 40 like the transmission type holographic recording medium, and these information light and reference light are made to cross each other within the recording layer 26 so as to form a reflection type hologram in the modulated region (not shown) by the interference of these two light beams.

Figure 4:
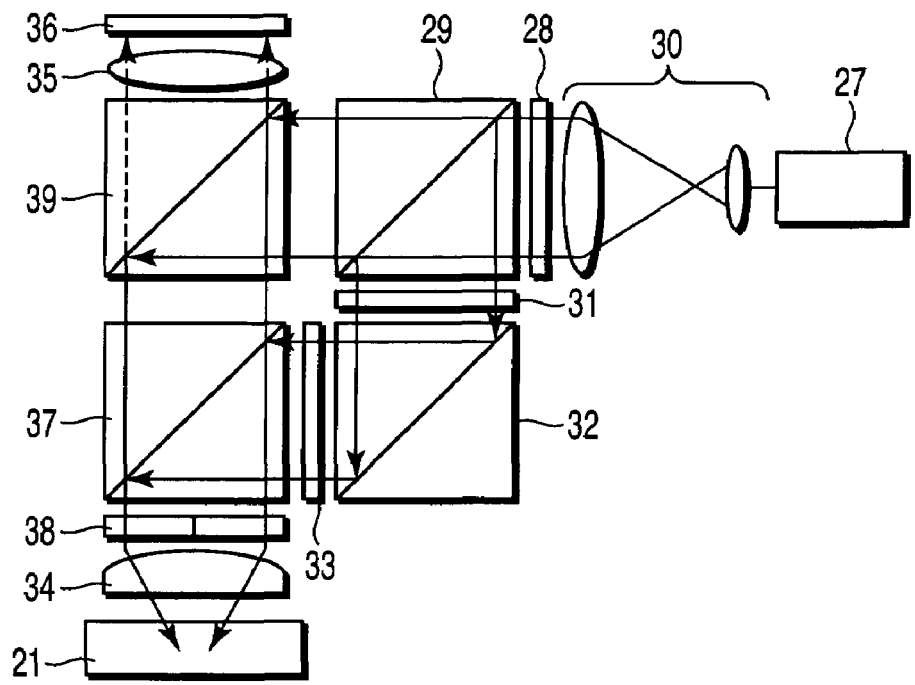
FIG. 4 schematically shows the construction of a reflection type holographic information recording-readout apparatus.

FIG. 4 schematically exemplifies the construction of a reflection type holographic recording-readout apparatus. How to record information in the reflection type holographic recording medium 21 will now be described with reference to FIG. 4.

As shown in the drawing, the reflection type holographic recording-readout apparatus comprises a light source device 27. It is desirable to use a laser that emits a coherent linear polarized light beam as the light source device 27 as in the transmission type holographic recording-readout apparatus shown in FIG. 2. The laser noted above includes, for example, a semiconductor laser, an He—Ne laser, an argon laser, and a YAG laser.

The light beam emitted from the light source device 27 passes through a beam expander 30 so as to have the beam diameter expanded and, then, is incident on a wave plate 28 in the form of a parallel light flux.

The wave plate 28 rotates the polarized plane of the incident light beam or causes the incident light beam to be converted into a circular polarized light or an elliptical polarized light so as to emit a light beam having a polarized light component having the polarized plane parallel to the paper (hereinafter referred to as a P-polarized light component) and a polarized component having the polarized plane perpendicular to the paper (hereinafter referred to as an S-polarized light component). It is possible for the wave plate 28 to be formed of, for example, a ½ wavelength plate or a ¼ wavelength plate.

The S-polarized light component of the light beam emitted from the wave plate 28 is reflected by a polarizing beam splitter 29 so as to be incident on a transmission type spatial optical modulator 31. On the other hand, the P-polarized light component is transmitted through a polarizing beam splitter 29. The P-polarized light component is utilized as a reference light.

The transmission type spatial optical modulator 31 comprises a large number of pixels arranged to form a matrix as in, for example, a transmission type liquid crystal display device and is capable of switching the light beam emitted therefrom between the P-polarized light component and the S-polarized light component for each pixel. In this fashion, the transmission type spatial optical modulator 31 emits an information light provided with distribution of two dimensional polarized planes in conformity with the information to be recorded.

Then, the information light emitted from the transmission type spatial optical modulator 31 is incident on a polarizing beam splitter 32. The S-polarized light component alone of the information light is reflected by the polarizing beam splitter 32, and the P-polarized light component of the information light is transmitted through the polarizing beam splitter 32.

The S-polarized light component reflected by the polarizing beam splitter 32 is transmitted through an electromagnetic shutter 33 as an information light provided with a two dimensional intensity distribution so as to be incident on a polarizing beam splitter 37. The information light incident on the polarizing beam splitter 37 is reflected by the polarizing beam splitter 37 so as to be incident on a two-divided wave plate 38.

The right portion and the left portion of the two-divided wave plate 38 differ from each other in optical characteristics. To be more specific, the polarized plane of, for example, the light component of the information light that is incident on the right portion of the two-divided wave plate 38 is rotated by +45° and, then, emitted from the wave plate 38. On the other hand, the polarized plane of, for example, the light component of the information light that is incident on the left portion of the two-divided wave plate 38 is rotated by −45° and, then, is emitted from the wave plate 38. The S-polarized light component having the polarized plane rotated by +45° (or the P-polarized light component having the polarized plane rotated by −45°) is called an A-polarized light component in the following description. Also, the S-polarized light component having the polarized plane rotated by −45° (or the P-polarized light component having the polarized plane rotated by +45°) is called a B-polarized light component in the following description. Incidentally, it is possible to use, for example, a ½ wavelength plate in each portion of the two-divided wave plate 38.

The A-polarized light component and the B-polarized light component emitted from the two-divided wave plate 38 are converged by an objective lens 34 on the reflective layer 22 of the holographic recording medium 21. Incidentally, the holographic recording medium 21 is arranged such that the transparent substrate 25 is positioned to face the objective lens 34.

On the other hand, a part of the P-polarized light component (reference light) passing through the polarizing beam splitter 29 is reflected by the beam splitter 39 so as to be transmitted through the polarizing beam splitter 37. The reference light transmitted through the polarizing beam splitter 37 is, then, incident on the two-divided wave plate 38. The polarized plane of the light component incident on the right portion of the two-divided wave plate 38 is rotated by +45° so as to be emitted from the wave plate 38 as a B-polarized light component. Also, the polarized plane of the light component incident on the left portion of the two-divided wave plate 38 is rotated by −45° so as to be emitted from the wave plate 38 as an A-polarized light component. Then, the A-polarized light component and the B-polarized light component are converged by the objective lens 34 on the reflective layer 22 of the holographic recording medium 21.

As described above, the A-polarized light component constituting the information light and the B-polarized light component constituting the reference light are emitted from the right portion of the two-divided wave plate 38. On the other hand, the B-polarized light component constituting the information light and the A-polarized light component constituting the reference light are emitted from the left portion of the two-divided wave plate 38. Also, the information light and the reference light are converged on the reflective layer 22 of the holographic recording medium 21.

Such being the situation, the interference between the information light and the reference light is generated only between the information light (or direct light) that is incident directly on the recording layer 26 via the transparent substrate 25 and the reference light reflected from the reflective layer 22 and between the reference light consisting of the direct light and the information light consisting of the reflected light. Also, interference does not take place between the information light consisting of the direct light and the information light consisting of the reflected light and between the reference light consisting of the direct light and the reference light consisting of the reflected light. It follows that, according to the recording-readout apparatus shown in FIG. 4, it is possible for the distribution of optical characteristics corresponding to the information light to be generated within the recording layer 26.

In order to stabilize the recorded hologram, it is also possible to mount the ultraviolet light source device and the optical system for the ultraviolet light irradiation as described above to the reflection type holographic recording-readout apparatus shown in FIG. 4.

The information recorded in the recording layer 26 by the method described above can be readout as follows. Specifically, the electromagnetic shutter 33 is closed so as to permit the recording layer 26 having information recorded therein previously to be irradiated with the reference light alone. As a result, the reference light alone consisting of the P-polarized light component arrives at the two-divided wave plate 38. The polarized plane of the reference light incident on the right portion of the two-divided wave plate 38 is rotated by +45° so as to be emitted from the wave plate 38 as the B-polarized light component. Likewise, the polarized plane of the reference light incident on the left portion of the two-divided wave plate 38 is rotated by −45° so as to be emitted from the wave plate 38 as the A-polarized light component. Then, the A-polarized light component and the B-polarized light component are converged by the objective lens 34 on the reflective layer 22 of the holographic recording medium 21.

The distribution of the optical characteristics corresponding to the information is formed by the method described above on the recording layer 26 of the holographic recording medium 21. As a result, the A-polarized light component and the B-polarized light component incident on the holographic recording medium 21 are partly diffracted by the distribution of the optical characteristics formed in the recording layer 26 so as to be emitted from the holographic recording medium 21 as a readout light.

The readout light emitted from the holographic recording medium 21, which reproduces the information light, is converted into a parallel light flux by the objective lens 34 and, then, runs to reach the two-divided wave plate 38. The B-polarized light component incident on the right portion of the two-divided wave plate 38 is emitted from the wave plate 38 as the P-polarized light component, and the A-polarized light component incident on the left portion of the two-divided wave plate 38 is emitted from the wave plate 38 as the P-polarized light component. In this fashion, it is possible to obtain the readout light consisting of the P-polarized light component.

Then, the readout light is transmitted through the polarizing beam splitter 37. The readout light transmitted through the polarizing beam splitter 37 is partly transmitted through the beam splitter 39. Then, an image is formed by an image-forming lens 35 on a two dimensional photo detector 36 in a manner to reproduce the image of the transmission type spatial optical modulator 31. In this fashion, the information recorded in the holographic recording medium 21 is readout.

On the other hand, the residual portions of the A-polarized light component and the B-polarized light component, which are transmitted through the two-divided wave plate 38 so as to be incident on the holographic recording medium 21, are reflected by the reflective layer 22 so as to be emitted from the holographic recording medium 21. The A-polarized light component and the B-polarized light component as the reflected light are converted by the objective lens into a parallel light flux. Then, the A-polarized light component is incident on the right portion of the two-divided wave plate 38 so as to be emitted from the wave plate 38 as the S-polarized light component. Likewise, the B-polarized light component is incident on the left portion of the two-divided wave plate 38 so as to be emitted from the wave plate 38 as the S-polarized light component. The S-polarized light component emitted from the two-divided wave plate 38 is reflected by the polarizing beam splitter 37 and, thus, is incapable of reaching the two dimensional photo detector 36. It follows that the recording-readout apparatus shown in FIG. 4 permits achieving an excellent readout SN ratio.

The holographic recording medium according to the embodiment of the present invention can be suitably used for the recording-readout of a multi-layered information. Either the transmission type readout or the reflection type readout can be employed for the recording-readout of the multi-layered light information.

The present invention will now be described more in detail with reference to Examples. Incidentally, in the Examples described in the following, a series of operations were carried out within a room shielded from the light having the wavelength shorter than 600 nm in order to prevent the recording layer from being sensitized to light.

EXAMPLE 1

In the first step, a uniform monomer solution was obtained by adding 6.235 g of N-vinylcarbazole used as a radically polymerizable compound to 15.1 g of 1,6-hexanediol diglycidyl ether of a liquid form (epoxy equivalent of 151, manufactured by Nagase ChemteX Corporation) while stirring the mixture at a temperature of about 20 degrees Centigrade.

Then, 0.110 g of Irgacure 784, manufactured by Ciba Specialty Chemicals Inc., and used as a photo radical polymerization initiator, and 3.605 g of diethylenetriamine, used as a curing agent, were added to the monomer solution noted above while stirring the mixture. After the added components were dissolved completely, 0.020 g of "Perbutyl H" (trade name of a radical polymerization initiator manufactured by NOF Corporation) was added to the resultant solution while stirring the mixture so as to obtain a solution, followed by defoaming the solution so as to obtain a solution of the recording layer material. The solution thus prepared was poured into a clearance between two glass plates arranged to face each other with a spacer formed of a Teflon® sheet interposed therebetween in the peripheral regions of the two glass plates. These glass plates were shielded from light and stored for 24 hours at room temperature (25° C.) so as to obtain a test piece of a transmission type holographic recording medium including a recording layer having a thickness of 200 μm.

Since the polymer matrix precursor was three dimensionally cross-linked at room temperature so as to be cured, the entire recording layer was solidified. The test piece thus obtained was mounted to the rotary stage 13 of the hologram recording apparatus shown in FIG. 2 so as to record the hologram. A semiconductor laser (405 nm) was used as the light source device 1. The light spot on the test piece was sized at 5 mmφ for each of the information light 10 and the reference light 11, and the intensity of the recording light including the information light and the reference light was adjusted at 5 mW/cm$^2$.

After the hologram recording, the electromagnetic shutter 8 was closed so as to intercept the information light 10 and to allow the test piece of the holographic recording medium to be irradiated with the reference light 11 alone. Diffracted light from the test piece was recognized so as to confirm that a transmission type hologram was recorded in the test piece. After irradiation with the light having a dose of 50 mJ/cm$^2$, the saturation was achieved at the diffraction efficiency of 85%.

The recording performance of the hologram was evaluated by M/# (M number) representing the recording dynamic range. The angular multiplexing recording-readout was carried out by irradiating the holographic recording medium 12 with a prescribed light while rotating the rotary stage 13.

Incidentally, used as the diffraction efficiency η was the internal diffraction efficiency represented by $\eta=I_d/(I_t+I_d)$, where $I_t$ denotes the light intensity detected by the photo detector 14 and $I_d$ denotes the light intensity detected by the photo detector 15 when the holographic recording medium 12 is irradiated with the reference light 11 alone.

The holographic recording medium having a large value of M/# has a large recording dynamic range and is excellent in the multiplex recording performance.

Figure 5:
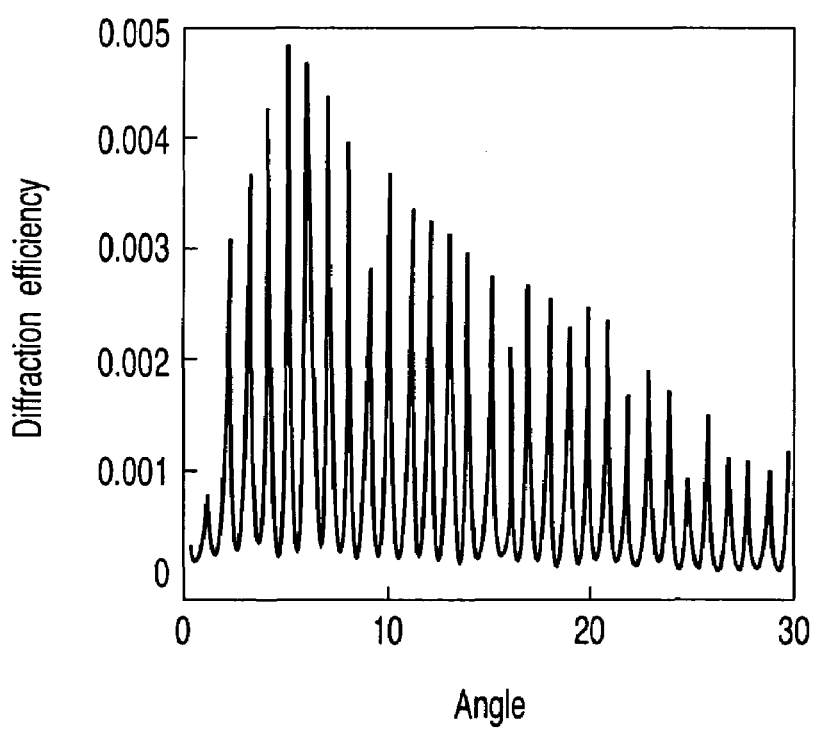
FIG. 5 is a graph exemplifying a holographic angular multiplexing readout signal according to one embodiment of the present invention.

FIG. 5 exemplifies the readout signal in the case of carrying out the angular multiplexing recording and readout. Incidentally, it is possible to calculate the rate of change in the volume (volume shrinking rate) of the holographic recording layer 19 before and after the holographic recording on the basis of the shift amount of the angle of the peak of the diffraction efficiency from each hologram.

In this Example, an angular multiplexing recording of a hologram of 30 pages was performed by rotating the test piece in a manner to make a single complete rotation by using the rotary stage 13 every time a single page is recorded, and by repeating the rotation of the test piece, with the light exposure dosage for one page of the hologram set at 1 mJ/cm². Further, the holographic recording medium was left to stand for 5 minutes without applying a light irradiation to the holographic recording medium in order to await the completion of the reaction, followed by measuring the diffraction efficiency η while sweeping the rotary stage so as to obtain the value of M/# and the volume shrinking rate.

The value of M/# of the recording medium was found to be 5.2, and the volume shrinking rate caused by the recording was found to be 0.16%.

EXAMPLE 2

In the first step, a uniform monomer solution was prepared by adding 4.442 g of N-vinylcarbazole (VC) and 0.234 g of N-vinylpyrrolidone (VP), which were used as radically polymerizable compounds, to 15.1 g of 1,6-hexanediol diglycidyl ether (epoxy equivalent of 151, manufactured by Nagase ChemteX Corporation) while stirring the mixture. The weight ratio VC/(VC+VP) was 0.95.

Then, 0.100 g of Irgacure, 784 referred previously, and 3.605 g of diethylenetriamine, used as a curing agent, were added to the monomer solution noted above while stirring the mixture. After the added components were dissolved completely, 0.020 g of Perbutyl H referred to previously was added to the resultant solution while stirring the mixture so as to obtain a solution, followed by defoaming the solution so as to obtain a solution of the recording layer material. Further, a test piece of a transmission type holographic recording medium was obtained as in Example 1 by using the solution of the recording layer material thus prepared.

Since the polymer matrix precursor was three dimensionally cross-linked at room temperature so as to be cured, the entire recording layer was solidified. The test piece thus obtained was irradiated with the information light and the reference light under the conditions equal to those in Example 1, with the result that a transmission type hologram was recorded in the test piece. After the light irradiation with the light having a dose of 50 mJ/cm², the saturation was achieved at the diffraction efficiency of 76%.

Further, the value of M/# and the volume shrinking rate were obtained by performing an angular multiplexing recording-readout of a hologram of 30 pages, with the light exposure dosage for one page of the hologram set at 1 mJ/cm², as in Example 1. The value of M/# of the recording medium was found to be 4.6, and the volume shrinking rate caused by the recording was found to be 0.12%.

EXAMPLE 3

In the first step, a uniform monomer solution was prepared by adding 4.956 g of N-vinylcarbazole, which was used as a radically polymerizable compound, to 15.1 g of 1,6-hexanediol diglycidyl ether (epoxy equivalent of 151, manufactured by Nagase ChemteX Corporation) while stirring the mixture. Then, 0.110 g of Irgacure 784 referred to previously and 4.725 g of tetraethylenepentaamine used as a curing agent were added to the monomer solution noted above while stirring the mixture. After the added components were dissolved completely, 0.020 g of Perbutyl H referred to previously was added to the resultant solution while stirring the mixture so as to obtain a solution, followed by defoaming the solution so as to obtain a solution of the recording layer material. Further, a test piece of a transmission type holographic recording medium was obtained as in Example 1 by using the solution of the recording layer material thus prepared.

Since the polymer matrix precursor was three dimensionally cross-linked at room temperature so as to be cured, the entire recording layer was solidified. The test piece thus obtained was irradiated with the information light and the reference light under the conditions equal to those in Example 1, with the result that a transmission type hologram was recorded in the test piece. After the light irradiation with the light having a dose of 80 mJ/cm², the saturation was achieved at the diffraction efficiency of 72%.

Further, the value of M/# and the volume shrinking rate were obtained by performing an angular multiplexing recording-readout of a hologram of 30 pages, with the light exposure dosage for one page of the hologram set at 1 mJ/cm², as in Example 1. The value of M/# of the recording medium was found to be 4.5, and the volume shrinking rate caused by the recording was found to be 0.11%.

EXAMPLE 4

In the first step, a uniform monomer solution was prepared by adding 3.566 g of N-vinylcarbazole (VC) and 0.629 g of N-vinylpyrrolidone (VP), which were used as radically polymerizable compounds, to 12.2 g of diethylene glycol diglycidyl ether (epoxy equivalent of 122, manufactured by Nagase ChemteX Corporation) of as an epoxy compound while stirring the mixture. The weight ratio VC/(VC+VP) was 0.85.

Then, 0.094 g of Irgacure 784, referred to previously, and 4.58 g of tetraethylenepentaamine diaminopropylamine, used as a curing agent, were added to the monomer solution noted above while stirring the mixture. After the added components were dissolved completely, 0.020 g of Perbutyl H referred to previously was added to the resultant solution while stirring the mixture so as to obtain a solution, followed by defoaming the solution so as to obtain a solution of the recording layer material. Further, a test piece of a transmission type holographic recording medium was obtained as in Example 1 by using the solution of the recording layer material thus prepared.

Since the polymer matrix precursor was three dimensionally cross-linked at room temperature so as to be cured, the entire recording layer was solidified. The test piece thus obtained was irradiated with the information light and the reference light under the conditions equal to those in Example 1, with the result that a transmission type hologram was recorded in the test piece. After the light irradiation with the light having a dose of 90 mJ/cm$^2$, the saturation was achieved at the diffraction efficiency of 75%.

Further, the value of M/# and the volume shrinking rate were obtained by performing an angular multiplexing recording-readout of a hologram of 30 pages, with the light exposure dosage for one page of the hologram set at 1 mJ/cm$^2$, as in Example 1. The value of M/# of the recording medium was found to be 4.3, and the volume shrinking rate caused by the recording was found to be 0.12%.

EXAMPLE 5

In the first step, a uniform monomer solution was prepared by adding 4.676 g of N-vinylcarbazole, which was used as a radically polymerizable compound, to 15.1 g of 1,6-hexanediol diglycidyl ether (epoxy equivalent of 151, manufactured by Nagase ChemteX Corporation) while stirring the mixture. Then, 0.011 g of Irgacure 819, used as a photo radical polymerization initiator, which was manufactured by Ciba Specialty Chemicals Inc., and 3.605 g of diethylenetriamine, used as a curing agent, were added to the monomer solution noted above while stirring the mixture, followed by defoaming the monomer solution so as to obtain a solution of the recording layer material. Further, a test piece of a transmission type holographic recording medium was obtained as in Example 1 by using the solution of the recording layer material thus prepared.

Since the polymer matrix precursor was three dimensionally cross-linked at room temperature so as to be cured, the entire recording layer was solidified. The test piece thus obtained was irradiated with the information light and the reference light under the conditions equal to those in Example 1, with the result that a transmission type hologram was recorded in the test piece. After the light irradiation with the light having a dose of 95 mJ/cm$^2$, the saturation was achieved at the diffraction efficiency of 74%.

Further, the value of M/# and the volume shrinking rate were obtained by performing an angular multiplexing recording-readout of a hologram of 30 pages, with the light exposure dosage for one page of the hologram set at 1 mJ/cm$^2$, as in Example 1. The value of M/# of the recording medium was found to be 4.0, and the volume shrinking rate caused by the recording was found to be 0.16%.

COMPARATIVE EXAMPLE 1

A uniform solution was obtained by stirring a mixture consisting of 12.2 g of diethylene glycol diglycidyl ether (epoxy equivalent of 122) referred to previously as an epoxy compound and 3.605 g of diethylenetriamine as a curing agent. The solution thus obtained was used as a matrix solution.

On the other hand, a uniform solution was obtained by mixing radically polymerizable compounds comprising 1.932 g of N-vinylcarbazole (VC) and 1.111 g of N-vinylpyrrolidone (VP) and 0.094 g of Irgacure 784 referred to previously, which was used a photo radical polymerization initiator. The solution thus obtained was used as the monomer solution. The molar amount of each of VC and VP was 0.01 mol, and the weight ratio VC/(VC+VP) was 0.635.

After 8 g of the matrix solution was mixed with 2 g of the monomer solution, 0.016 g of Perbutyl H referred to previously, which was used as a radical polymerization initiator, was added to the mixture while stirring the mixture, followed by defoaming the mixture so as to obtain a solution of the recording layer material. Further, a test piece of a transmission type holographic recording medium was obtained as in Example 1 by using the solution of the recording layer material thus prepared.

Since the polymer matrix precursor was three dimensionally cross-linked at room temperature so as to be cured, the entire recording layer was solidified. The test piece thus obtained was irradiated with the information light and the reference light under the conditions equal to those in Example 1, with the result that a transmission type hologram was recorded in the test piece. After the light irradiation with the light having a dose of 150 mJ/cm$^2$, the saturation was achieved at the diffraction efficiency of 72%.

Further, the value of M/# and the volume shrinking rate were obtained by performing an angular multiplexing recording-readout of a hologram of 30 pages, with the light exposure dosage for one page of the hologram set at 1 mJ/cm$^2$, as in Example 1. The value of M/# of the recording medium was found to be 2.4, and the volume shrinking rate caused by the recording was found to be 0.18%. As apparent from the experimental data, the sensitivity and the value of M/# were found to be lower than those for the Examples described above in the case where the weight ratio of N-vinylcarbazole (VC) to the sum of N-vinylcarbazole (VC) and N-vinylpyrrolidone (VP), i.e., VC/(VC+VP), is small, i.e., 0.635.

EXAMPLE 6

In this Example, a reflection type holographic recording medium 21 constructed as shown in FIG. 3 was manufactured.

In the first step, prepared was a square quartz glass substrate 22 (5 cm×5 cm) having a thickness of 0.5 mm and having a reflective layer 22 formed on one surface. The reflective layer 22, which comprising an aluminum layer having a thickness of 200 nm, was formed on one surface of the glass substrate 22 by a sputtering method. Then, a solution of the recording layer material used for forming the recording layer 26 was prepared by the method similar to that described previously in conjunction with Example 1. On the other hand, a spacer 24 formed of a Teflon® sheet and having a thickness of 250 μm was disposed on that side of the quartz substrate 23 which was opposite to the side of the reflective layer 22 formed of the aluminum layer. The spacer 24 was formed along the periphery of the quartz substrate 23. Then, the solution of the recording layer material was cast into the clearance defined by the spacer 24 in the central region of the substrate 23. After the casting, a transparent substrate 25 formed of a quartz glass substrate that had been prepared separately was disposed to face the substrate 23 with the spacer 24 and the cast solution of the recording layer material sandwiched therebetween. Further, the resultant structure was pressurized uniformly and, then, left to stand for 24 hours at room temperature (25° C.) so as to manufacture a holographic recording medium 21 including the recording layer 26 having a thickness of 250 μm.

The holographic recording medium 21 thus obtained was mounted to the reflection type holographic recording-readout apparatus constructed as shown in FIG. 4 for performing the information recording. A second higher harmonic wave (wavelength of 532 nm) of a Nd:YAG laser was used as the coherent light emitted from the light source 27, and a ½ wavelength plate was used as the wave plate 28. Also, a liquid crystal panel was used as the transmission type spatial optical modulator 31. Further, the direction of the ½ wavelength plate used as the wave plate 28 was adjusted such that the information light and the reference light are made equal to each other in intensity on the surface of the holographic recording medium 21. Still further, the intensity of each of the information light and the reference light on the surface of the holographic recording medium 21 was set at 0.1 mW, and the spot size of the laser beam on the upper surface of the recording layer 26 was 500 μm in diameter.

For determining the recording starting position, the holographic recording medium 21 was irradiated with the reference light alone having the intensity set at 0.002 mW on the surface of the holographic recording medium 21, and the holographic recording medium 21 was moved in a direction perpendicular to the optical axis of the objective lens 34 while monitoring the output of the two dimensional photo detector 36. The position at which the output from the photo detector 36 ceased to be changed was used as the recording starting position.

The information recorded in the holographic recording medium was readout by using the recording-readout apparatus constructed as shown in FIG. 4. In reading out the recorded information, the intensity of the reference light on the surface of the holographic recording medium 21 was set at 0.02 mW by adjusting the direction of the ½ wavelength plate used as the wave plate 28. Also, a CCD array was used as the two dimensional photo detector 36.

As a result, it has been confirmed that the information can be written in and readout from the holographic recording medium 21 before exposure to light.

Then, the additional recording capability of the reflection type holographic recording medium 21 was evaluated.

The method of evaluating the recording capability of the reflection type holographic recording medium will now be described first. In the reflection type holographic recording medium, it is difficult to perform the angular multiplexing recording described in, for example, Example 1. Therefore, the recording capability was evaluated by the shift multiplexing recording in which a hologram is multiplexing-recorded by parallel moving the holographic recording medium. The shift multiplexing recording was carried out as follows. Specifically, after a hologram was recorded in the holographic recording medium 21, the holographic recording medium 21 was parallel moved by 50 μm in a direction perpendicular to the optical axis of the objective lens 34 so as to record a different hologram. The shift multiplexing recording was performed by repeating the operation described above a plurality of times. The value of M/# and the volume shrinking rate were obtained by the method described previously, except that a hologram of 20 pages was subjected to the multiplexing recording-readout with the light exposure dosage per page set at 20 mJ/cm². The diffraction efficiency η obtained by the numerical formula given below was used for calculating the value of M/#:

$$\eta = I_d/I \times R \times (1-R)$$

where I denotes the intensity of the light transmitted through the polarizing beam splitter 29 in the readout stage, R denotes the reflectance of the beam splitter 39, and $I_d$ denotes the intensity of the diffracted light that is measured by the CCD array 36.

The value of M/# was found to be 5.0 and the volume shrinking rate caused by the recording was found to be 0.13%. In other words, it has been confirmed that a high sensitivity can be obtained and the volume shrinkage caused by the recording is small in the reflection type holographic recording medium, too, as in the transmission type holographic recording medium.

EXAMPLE 7

In this Example, 5 kinds of recording layers were prepared by changing the weight ratio of N-vinylcarbazole (VC) to the sum of N-vinylcarbazole and N-vinylpyrrolidone (VP), i.e., VC/(VC+VP), within a range of 0.63 to 1 so as to examine the relationship between the weight ratio VC/(VC+VP) and the value of M/# and the relationship between the weight ratio VC/(VC+VP) and the sensitivity.

In the first step, a uniform monomer solution was prepared by adding N-vinylcarbazole (VC) and N-vinylpyrrolidone (VP), which were added in a total amount of 1.871 g, to 6.04 g of 1,6-hexanediol diglycidyl ether (epoxy equivalent of 151) referred to previously while stirring the mixture.

Then, added to the monomer solution were 0.042 g of Irgacure 784, referred to previously, which was used as a photo radical polymerization initiator, and 1.442 g of diethylenetriamine, used as a curing agent, while stirring the mixture. After the added components were dissolved completely, 0.008 g of Perbutyl H referred to previously, which was used as the radical polymerization initiator, was added to the resultant solution while stirring the mixture so as to obtain a solution, followed by defoaming the solution so as to obtain a solution of the recording layer material. The solution thus prepared was poured into a clearance between two glass plates arranged to face each other with a spacer formed of a Teflon® sheet interposed therebetween in the peripheral portions of the two glass plates. These glass plates were shielded from light and stored for 24 hours at room temperature (25° C.) so as to obtain a test piece of a transmission type holographic recording medium including a recording layer having a thickness of 200 μm.

Since the polymer matrix precursor was three dimensionally cross-linked at room temperature so as to be cured, the entire recording layer was solidified. The test piece thus obtained was mounted to the rotary stage 13 of the hologram recording apparatus shown in FIG. 2 so as to record the hologram. A semiconductor laser (405 nm) was used as the light source device 1. The light spot on the test piece was sized at 4 mmφ for each of the information light 10 and the reference light 11, and the intensity of the recording light including the information light and the reference light was adjusted at 7 mW/cm².

FIG. 6 is a graph showing the relationship between the weight ratio of the monomers and the value of M/#, and FIG. 7 is a graph showing the relationship between the weight ratio of the monomers and the sensitivity (i.e., the inclination of the internal diffraction efficiency to the power of ½ relative to the light exposure dosage). As apparent from the graphs shown in FIGS. 6 and 7, the experimental data support that the recording medium in which the weight ratio VC/(VC+VP) falls within a range of 0.8 to 1 permits further improving the M/# and the sensitivity.

EXAMPLE 8

In the first step, a uniform solution was obtained by mixing 3.605 g of diethylenetriamine, used as a curing agent, with 15.1 g of 1,6-hexanediol diglycidyl ether (epoxy equivalent of 151) referred to previously, which was used as the epoxy compound, while stirring the mixture, followed by mixing 6.235 g of N-vinylcarbazole used as a radically polymerizable compound with the solution while stirring the solution so as to obtain a uniform solution.

Then, added to the solution was 0.110 g of Irgacure 784 referred to previously, which was used as a photo radical polymerization initiator, while stirring the mixture. After the added component was dissolved completely, 0.020 g of Perbutyl H referred to previously, which was used as the radical polymerization initiator, was added to the resultant solution while stirring the mixture so as to obtain a solution, followed by defoaming the solution so as to obtain a solution of the recording layer material. The solution thus prepared was poured into a clearance between two glass plates arranged to face each other with a spacer formed of a Teflon® sheet interposed therebetween in the peripheral portions of the two glass plates. These glass plates were shielded from light and stored for 24 hours at room temperature (25° C.) so as to obtain a test piece of a transmission type holographic recording medium including a recording layer having a thickness of 200 μm.

Since the polymer matrix precursor was three dimensionally cross-linked at room temperature so as to be cured, the entire recording layer was solidified. The test piece thus obtained was irradiated with the information light and the reference light under the conditions equal to those in Example 1. As a result, a transmission type hologram was recorded in the test piece. After the light irradiation with the light having a dose of 55 mJ/cm$^2$, the saturation was achieved at the diffraction efficiency of 86%.

Further, the value of M/# and the volume shrinking rate were obtained by performing an angular multiplexing recording-readout of a hologram of 30 pages, with the light exposure dosage for one page of the hologram set at 1 mJ/cm$^2$, as in Example 1. The value of M/# of the recording medium was found to be 4.8, and the volume shrinking rate caused by the recording was found to be 0.12%.

EXAMPLE 9

In the first step, a uniform solution was obtained by mixing 3.605 g of diethylenetriamine used as a curing agent with 12.2 g of diethylene glycol diglycidyl ether (epoxy equivalent of 122) referred to previously, which was used as the epoxy compound, while stirring the mixture, followed by mixing 3.328 g of N-vinylcarbazole (VC) and 0.587 g of N-vinylpyrrolidone (VP) both used as radically polymerizable compounds with the solution while stirring the solution so as to obtain a uniform solution. The weight ratio VC/(VC+VP) was 0.85.

Then, added to the solution was 0.094 g of Irgacure 784 referred to previously, which was used as a photo radical polymerization initiator, while stirring the mixture. After the added component was dissolved completely, 0.020 g of Perbutyl H referred to previously, which was used as the radical polymerization initiator, was added to the resultant solution while stirring the mixture so as to obtain a solution, followed by defoaming the solution so as to obtain a solution of the recording layer material. A test piece of a transmission type holographic recording medium was prepared as in Example 1 by using the solution of the recording material layer thus obtained.

Since the polymer matrix precursor was three dimensionally cross-linked at room temperature so as to be cured, the entire recording layer was solidified. The test piece thus obtained was irradiated with the information light and the reference light under the conditions equal to those in Example 1. As a result, a transmission type hologram was recorded in the test piece. After the light irradiation with the light having a dose of 70 mJ/cm$^2$, the saturation was achieved at the diffraction efficiency of 80%.

Further, the value of M/# and the volume shrinking rate were obtained by performing an angular multiplexing recording-readout of a hologram of 30 pages, with the light exposure dosage for one page of the hologram set at 1 mJ/cm$^2$, as in Example 1. The value of M/# of the recording medium was found to be 4.7, and the volume shrinking rate caused by the recording was found to be 0.11%.

EXAMPLE 10

In the first step, a uniform solution was obtained by mixing 3.605 g of diethylenetriamine used as a curing agent with 15.1 g of 1,6-hexanediol diglycidyl ether (epoxy equivalent of 151) referred to previously, which was used as the epoxy compound, while stirring the mixture, followed by adding 0.110 g of Irgacure 784 referred to previously, which was used as a photo radical polymerization initiator, to the resultant solution while stirring the solution so as to obtain a uniform solution. Then, 6.235 g of N-vinylcarbazole used as a radically polymerizable compound was mixed with the solution while stirring the solution so as to obtain a uniform solution.

After the added component was dissolved completely, 0.020 g of Perbutyl H referred to previously, which was used as the radical polymerization initiator, was added to the resultant solution while stirring the mixture so as to obtain a solution, followed by defoaming the solution so as to obtain a solution of the recording layer material. The solution thus prepared was poured into a clearance between two glass plates arranged to face each other with a spacer formed of a Teflon® sheet interposed therebetween in the peripheral portions of the two glass plates. These glass plates were shielded from light and stored for 24 hours at room temperature (25° C.) so as to obtain a test piece of a transmission type holographic recording medium including a recording layer having a thickness of 200 μm.

Since the polymer matrix precursor was three dimensionally cross-linked at room temperature so as to be cured, the entire recording layer was solidified. The test piece thus obtained was irradiated with the information light and the reference light under the conditions equal to those in Example 1. As a result, a transmission type hologram was recorded in the test piece. After the light irradiation with the light having a dose of 60 mJ/cm$^2$, the saturation was achieved at the diffraction efficiency of 85%.

Further, the value of M/# and the volume shrinking rate were obtained by performing an angular multiplexing recording-readout of a hologram of 30 pages, with the light exposure dosage for one page of the hologram set at 1 mJ/cm$^2$, as in Example 1. The value of M/# of the recording medium was found to be 4.7, and the volume shrinking rate caused by the recording was found to be 0.12%.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A holographic recording medium, comprising a recording layer containing a three dimensionally cross-linked polymer matrix including an epoxy compound, a radically polymerizable monomer, and a photo radical polymerization initiator, the epoxy compound comprising a compound that is in the form of a liquid at 20° C. or less and being selected from the group consisting of 1,4-butanediol diglycidyl ether, 1,6-hexanediol diglycidyl ether, diethylene glycol diglycidyl ether, polyethylene glycol diglycidyl ether, polypropylene glycol diglycidyl ether, neopentyl glycol diglycidyl ether, diepoxy octane, resorcinol diglycidyl ether, diglycidyl ether of bisphenol A, diglycidyl ether of bisphenol F, 3,4-epoxy cyclohexenyl methyl-3',4'-epoxy cyclohexene carboxylate and polydimethyl siloxane of epoxy propoxypropyl terminal, the radically polymerizable monomer comprising both N-vinylcarbazole and N-vinylpyrrolidone or N-vinylcarbazole alone, and the weight ratio satisfying the following relationship:

$$0.75 \leq VC/(VC+VP) \leq 1.0$$

wherein VC is weight of N-vinylcarbazole and VP is weight of N-vinylpyrrolidone.

2. The holographic recording medium according to claim 1, wherein the three dimensionally cross-linked polymer matrix is prepared by curing the epoxy compound by a curing agent.

3. The holographic recording medium according to claim 2, wherein the curing agent comprises an aliphatic primary amine.

4. The holographic recording medium according to claim 1, wherein the photo radical polymerization initiator is selected from the group consisting of benzoin ether, benzyl ketal, acetophenone derivatives, α-amino acetophenons, benzophenone derivatives, acyl phosphine oxides, triazines, titanocenes, organic peroxide, and thioxanthone derivatives.

5. The holographic recording medium according to claim 1, wherein the weight ratio represented by the relationship is not lower than 0.8.

6. The holographic recording medium according to claim 1, wherein the weight ratio represented by the relationship is not lower than 0.85.

7. The holographic recording medium according to claim 1, wherein a thickness of the recording layer falls within a range of not smaller than 20 μm and not larger than 2 mm.

8. A method of manufacturing a holographic recording medium, comprising:
dissolving both N-vinylcarbazole and N-vinylpyrrolidone or N-vinylcarbazole in an epoxy compound of liquid form to prepare a monomer solution, the epoxy compound being selected from the group consisting of 1,4-butanediol diglycidyl ether, 1,6-hexanediol diglycidyl ether, diethylene glycol diglycidyl ether, polyethylene glycol diglycidyl ether, polypropylene glycol diglycidyl ether, neopentyl glycol diglycidyl ether, diepoxy octane, resorcinol diglycidyl ether, diglycidyl ether of bisphenol A, diglycidyl ether of bisphenol F, 3,4-epoxy cyclohexenyl methyl-3',4'-epoxy cyclohexene carboxylate and polydimethyl siloxane of epoxy propoxypropyl terminal;
wherein the weight ratio of the monomers satisfys the following relationship:

$$0.75 \leq VC/(VC+VP) \leq 1.0,$$

where VC is the weight of N-vinylcarbazole and VP is the weight of N-vinylpyrrolidone;
preparing a solution of a recording material by adding a photo radical polymerization initiator, and a curing agent for the epoxy compound to the monomer solution;
coating a substrate with the solution of the recording layer material; and
curing the solution.

9. The method according to claim 8, wherein the photo radical polymerization initiator is selected from the group consisting of benzoin ether, benzyl ketal, acetophenone derivatives, α-amino acetophenons, benzophenone derivatives, acyl phosphine oxides, triazines, titanocenes, organic peroxide, and thioxanthone derivatives.

10. The method according to claim 8, wherein the curing agent comprises an aliphatic primary amine.

11. The method according to claim 8, wherein the radically polymerizable monomer is added in an amount of not smaller than 2% by weight and not larger than 50% by weight based on the sum of the epoxy compound, the curing agent, the photo radical polymerization initiator and the radically polymerizable monomer.

* * * * *